Dec. 18, 1923.  
J. F. CALLAWAY  
1,477,690  
FAN FOR CLEAR VISION  
Filed March 6, 1922    2 Sheets-Sheet 1
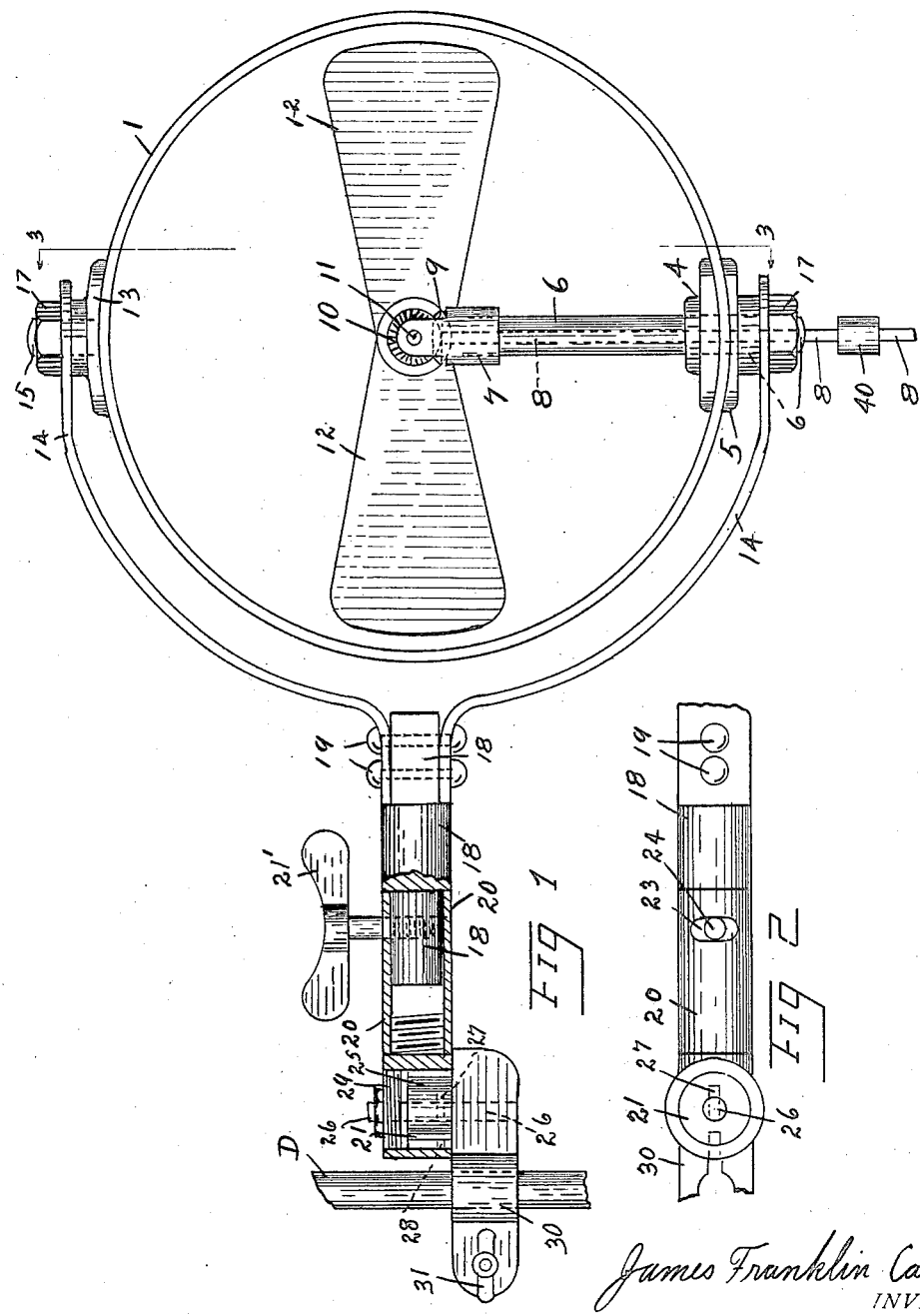
James Franklin Callaway  
INVENTOR.  
BY F. L. Horspool.  
ATTORNEY Dec. 18, 1923.
J. F. CALLAWAY
1,477,690
FAN FOR CLEAR VISION
Filed March 6, 1922    2 Sheets-Sheet 2
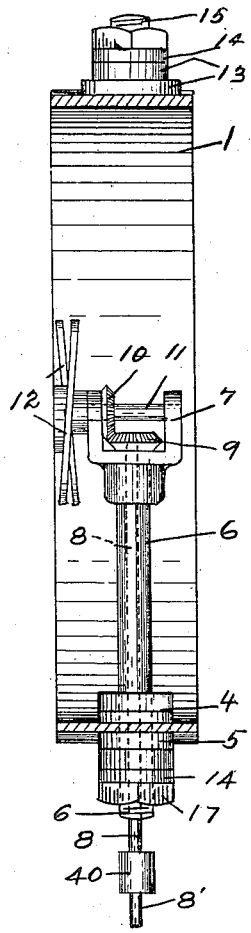
Fig 3
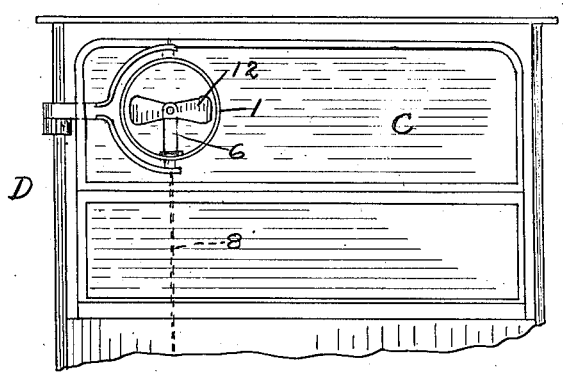
Fig 4
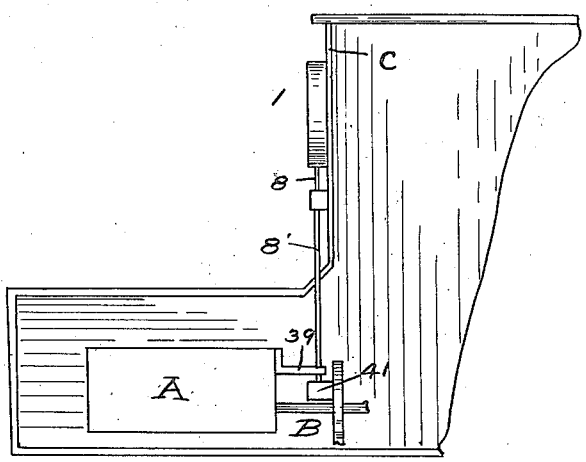
Fig 5
Fig 6
James Franklin Callaway,
INVENTOR.
BY F. L. Horspool,
ATTORNEY Patented Dec. 18, 1923.

1,477,690

UNITED STATES PATENT OFFICE.

JAMES FRANKLIN CALLAWAY, OF SALT LAKE CITY, UTAH.

FAN FOR CLEAR VISION.

Application filed March 6, 1922. Serial No. 541,613.

*To all whom it may concern:*

Be it known that I, JAMES FRANKLIN CALLAWAY, a citizen of the United States, residing at Salt Lake City, in the county of Salt Lake and State of Utah, have invented a new and useful Fan for Clear Vision, of which the following is a specification.

This invention relates to a fan to be used on automobiles, aeroplanes, locomotives, or any form of window where a clear vision is required.

One object of this invention is to provide a fan that will keep rain or snow off the wind shield of the automobile or aeroplane and not obstruct the vision of the driver.

Another object of this invention is to provide a fan that can be used on any locomotive cab window to keep off the rain, snow, dust or cinders.

Another object of this invention is to provide a fan that can be used with a hole cut in the glass back of the fan and the fan used for ventilation as well as for clear vision.

Another object of this invention is to provide a fan made of transparent material so that the revolving of the fan will not affect the vision.

Another object of this invention is to provide a fan that can be driven by air, steam, gasoline or electric motor.

Another object of this invention is to provide a fan that when used on an automobile or aeroplane can be operated by a flexible shaft driven from the fly wheel or from the fan belt of the engine.

Another object of this invention is to provide a fan for clear vision that can be adjusted to any desired angle and secured to any desirable place, as on the wind shield support.

Another object of this invention is to provide a fan that will generate a current of air outward while the automobile is running, to drive away from the window glass anything that will obstruct one's vision.

Another object of this invention is to provide a fan to be self adjusting to the glass that can be removed very quickly.

Another object of this invention is to provide a fan with a frame having a felt or rubber cushion secured thereto that will fit snugly to the glass and prevent anything passing between the frame and glass to obstruct one's vision.

Another object of this invention is to provide a fan that will protect the eyes by dulling the bright light of the sun or the reflection from the head light of the approaching car.

With these and other objects in view my invention consists of the following arrangement of parts to be hereinafter described and claimed, reference being had to the drawings forming part of this specification and to the figures of reference marked thereon.

I will describe my invention as applied to an automobile, in which:

Figure 1 is a view of my invention attached to a support.

Fig. 2 is a plan view of the arm and spring case.

Fig. 3 is a view on line 3—3 Fig. 1.

Fig. 4 is an inside view of an automobile looking out from the driver's seat showing my invention applied to the wind shield.

Fig. 5 is a side view of the wind shield and engine of an automobile showing my invention in place and driven from the fly wheel of the engine.

Fig. 6 is a view showing a section of the casing showing the cushion attached thereto.

Similar letters and numerals refer to like parts throughout the several views of the drawings.

A represents the automobile engine, B the fly wheel, C the wind shield, D the support for the wind shield.

My invention is composed of a casing 1. Flanges 4 and 5 secured to the bottom of the casing 1 through which passes and is secured therein the support 6. On the upper end of the support 6 is secured the bearing 7. Through the center of the support 6 passes the drive shaft 8. On the upper end of the drive shaft 8 is secured the gear 9 while on the lower end is secured a flexible shaft 8' by the coupling 40. On the lower end of the flexible shaft 8' is secured a friction gear 41 which lays to the face of the flywheel and is operated as the flywheel revolves.

The friction gear is held to the face of the fly wheel by the bracket 39 secured to the engine.

Secured in the bearing 7 is the driven shaft 11. On the driving shaft 11 is secured the driven gear 10 and the fan 12.

Secured to the top of the casing is another flange 13 having a pin 15 secured therein, which holds one end of the bracket 14 while the other end of said bracket is secured to the casing 1 by fitting over the lower end of the support 6 said bracket being secured to the casing by nuts 17.

The bracket 14 is secured to an arm 18 by rivets 19. The arm 18 fits within the sleeve 20. The sleeve 20 being secured to the spring case 21. The thumb screw 21' passing through the slot 23 in the sleeve 20 and then screwed in the hole 24 of the arm 18 prevents the arm working out of the sleeve and also allows the twisting movement to the casing 1 over the glass.

Placed within the spring case 21 is a coil spring 25, which is secured at one end to the shaft 26 by the pin 27. The other end being secured to spring case by the pin 28. The tension on this spring is secured turning the arm before the adjusting bracket is placed on the support for the wind shield. The spring when in tension will hold the casing 1 to the glass. A plug 29 is screwed in the spring case through which passes a shaft 26, a nut is placed on the outer end thus securing the spring case to the adjusting bracket.

The adjusting bracket 30 is clamped over the support for the wind shield D and secured thereto by the thumb screw 31.

Many changes can be made in the above construction of my invention, within the scope of the claims constructed without departing from the scope thereof. It is intended that all matter contained in the specification and drawings shall be interpreted as illustrated and not in a limited sense binding.

Having thus described my invention what I claim as new and desire to secure by Letters Patent, is:

1. A fan for clear vision, said fan within a casing, said casing having flanges thereon, one of said flanges having an upright support attached thereto for the support of said fan, a bracket secured to said frame, said bracket for supporting said frame, spring means in said bracket for holding said frame to said wind shield, said bracket having means therein for the adjustment of said bracket to said wind shield and means thereon for securing said bracket to the frame of said automobile.

2. A fan for clear vision, a frame for said fan having flanges secured thereto, a bracket pivotably connected to said frame for supporting said frame, said bracket having a sleeve secured thereon for adjusting the length of said bracket, said sleeve having a spring therein for holding said frame to said windshield, said sleeve having an adjusting bracket secured thereto for adjusting said fan to the frame of said automobile.

In witness whereof I affix my signature.

JAMES FRANKLIN CALLAWAY.